(12) United States Patent
Rodrigues

(10) Patent No.: US 6,588,704 B2
(45) Date of Patent: Jul. 8, 2003

(54) ACTUATOR APPARATUS, IN PARTICULAR FOR AN AIRCRAFT FLIGHT CONTROL

(75) Inventor: Fernand Rodrigues, Soisy sous Montmorency (FR)

(73) Assignee: TRW Systemes Aeronautiques Civils (FR)

(*) Notice: Subject to any disclaimer, the term of this patent is extended or adjusted under 35 U.S.C. 154(b) by 0 days.

(21) Appl. No.: 09/860,941

(22) Filed: May 18, 2001

(65) Prior Publication Data

US 2001/0042811 A1 Nov. 22, 2001

(30) Foreign Application Priority Data

May 22, 2000 (FR) .............................. 00 06550

(51) Int. Cl.[7] .............................. B64C 13/04
(52) U.S. Cl. .............................. 244/76 R
(58) Field of Search ............... 244/78, 76 A, 244/76 B, 75 R; 464/45, 46, 47, 48; 192/15, 18 A, 85 A

(56) References Cited

U.S. PATENT DOCUMENTS

| 3,426,650 A | * | 2/1969 | Jenney |
| 3,940,094 A | * | 2/1976 | Kress et al. |
| 3,958,779 A | * | 5/1976 | Townsend |
| 4,096,931 A | * | 6/1978 | Whitehurst |
| 4,533,097 A |   | 8/1985 | Aldrich |
| 4,577,738 A | * | 3/1986 | Yater |
| 4,683,407 A | * | 7/1987 | Barba et al. |
| 4,759,515 A | * | 7/1988 | Carl |
| 5,806,805 A | * | 9/1998 | Elbert et al. |
| 5,921,361 A | * | 7/1999 | Sommer |
| 6,227,481 B1 | * | 5/2001 | Fenny et al. |
| 6,241,182 B1 | * | 6/2001 | Durandeau et al. |

FOREIGN PATENT DOCUMENTS

| EP | WO 91 05698 A | 2/1991 |
| FR | 2 562 028 A | 4/1985 |

* cited by examiner

*Primary Examiner*—Tien Dinh
(74) *Attorney, Agent, or Firm*—Blakely Sokoloff Taylor & Zafman

(57) ABSTRACT

Actuator apparatus, in particular for an airplane flight control. The apparatus has at least two main drive systems and a differential which connects outlet shafts from the two systems to a control shaft connected to an element to be actuated and also including a mechanism for locking each outlet shaft of the drive systems when the system for driving it is no longer operating. The apparatus also includes at least one auxiliary drive motor and a clutch mechanism mounted on the outlet shaft of one of the main systems and suitable for automatically driving the outlet shaft using the auxiliary motor when the corresponding main drive system is not operating and for automatically locking the outlet shaft when the main drive system and the auxiliary motor are not operating.

7 Claims, 3 Drawing Sheets

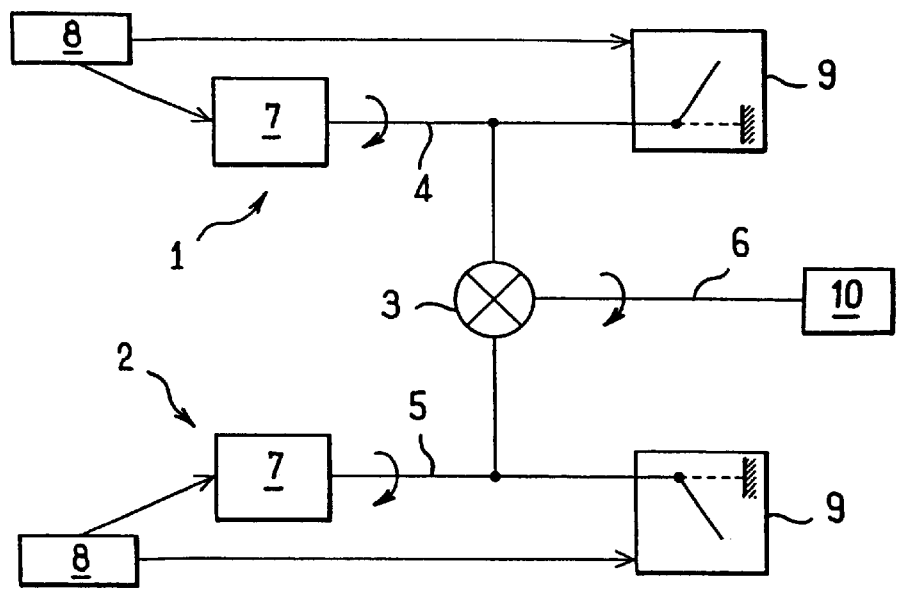
FIG_1
PRIOR ART
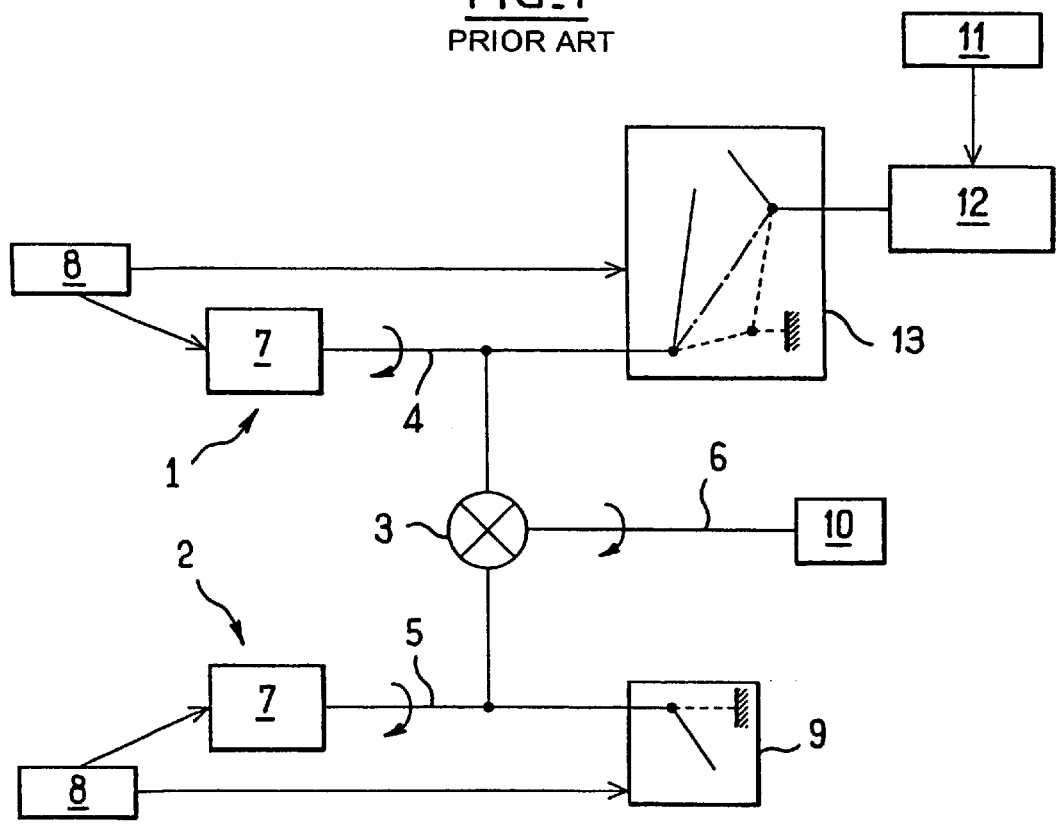
FIG_2

ACTUATOR APPARATUS, IN PARTICULAR FOR AN AIRCRAFT FLIGHT CONTROL

The present invention relates to actuator apparatus, in particular for an aircraft flight control.

A particularly advantageous application of the invention lies in actuating an element for adjusting a tail plane on an airplane (pitch control), but other applications are also possible.

BACKGROUND OF THE INVENTION

In certain airplanes, pitch control surfaces are actuated, as shown in FIG. 1, by means of two main drive systems 1 and 2, and by means of a differential 3 which connects outlet shafts 4, 5 from said two systems to a control shaft 6 connected to a pitch control surface 10.

In general, these two systems 1 and 2 are hydraulic systems. Each of them comprises a hydraulic motor 7 actuated by a hydraulic source 8, together with brake-forming means 9 which enable the shaft of said motor 7 to be locked whenever the hydraulic pressure in the corresponding system becomes low, so as to define a bearing point for the differential 3 and allow the second hydraulic system on its own to drive the differential 3 and the control shaft 6 connected to the pitch control surface 10.

It is desirable to make actuator devices even safer so as to minimize risk in the event of breakdown.

OBJECTS AND SUMMARY OF THE INVENTION

Objects of the invention are to propose a solution for this purpose that is both simple and particularly reliable.

To this end, the invention provides actuator apparatus, in particular for an airplane flight control, the device comprising at least two main drive systems and a differential which connects outlet shafts from the two systems to a control shaft connected to an element to be actuated and also including means for locking each outlet shaft of the drive systems when the system for driving it is not operating; the apparatus including at least one auxiliary drive motor and a clutch mechanism mounted on the outlet shaft of one of the main systems and suitable for automatically driving said outlet shaft by means of the auxiliary motor when the corresponding main drive system is not operating and for automatically locking said outlet shaft when said main drive system and said auxiliary motor are not operating.

In a particularly advantageous variant, the clutch mechanism comprises:

an intermediate rotor mounted to rotate on the outlet shaft;

first friction means interposed between said intermediate rotor and a portion secured to the outlet shaft, said first friction means, when in engagement, uniting said intermediate rotor and said outlet shaft;

second friction means interposed between said intermediate rotor and a casing of the mechanism, said second friction means, when in engagement, uniting said intermediate rotor and said casing;

spring means suitable for exerting a force on a portion secured to the outlet shaft, said force tending firstly to put the first friction means into engagement and secondly, when said means are in engagement, to exert an axial force on the intermediate rotor tending to put the second friction means into engagement;

means which oppose the force exerted by the spring means so long as the main drive system for the outlet shaft is in operation; and a cam and cam follower means interposed between said intermediate rotor and a rotor which is mounted to rotate on the outlet shaft and which is driven by the auxiliary motor, said cam and said cam follower means being such that when the auxiliary motor is in operation while the main drive system is not in operation, they push the intermediate rotor axially back into a position where the second friction means are no longer in engagement and in which said intermediate rotor is driven.

It will be observed that such a structure makes it possible to declutch the auxiliary motor automatically as soon as the motor ceases to turn or the main system on which it is mounted is in operation.

It makes it possible to lock the outlet shaft of the main system and the outlet of the auxiliary motor when neither said auxiliary motor nor said main system is operating.

A particularly advantageous application of the invention lies in the case where the main drive systems are of the hydraulic type and where the auxiliary drive motor is of the electrical type.

In which case, it is preferable for the means which oppose the force exerted by the spring means so long as the main drive system of the outlet shaft are in operation, to be of the hydraulic piston type with the force exerted by said piston being a function of the pressure in said main drive system.

In other variant embodiments, these means can be of the solenoid type.

BRIEF DESCRIPTION OF THE DRAWINGS

Other characteristics and advantages of the invention appear further from the following description which is purely illustrative and non-limiting and should be read with reference to the accompanying drawings, in which:

FIG. 1, described above, is a block diagram of a prior art actuator mechanism;

FIG. 2 is a block diagram of an actuator mechanism constituting a possible embodiment of the invention;

MORE DETAILED DESCRIPTION

Figure 3:
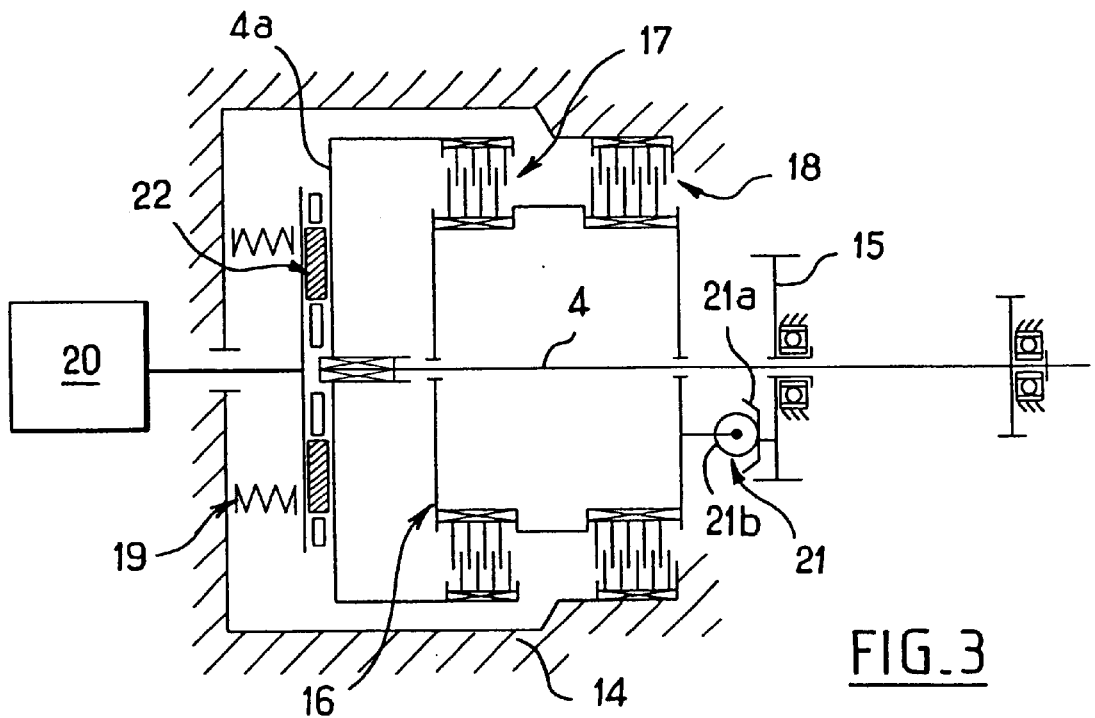
FIGS. 3 and 4 are respectively a functional diagram and a cross-section view showing a possible embodiment of the assembly 13 of the mechanism shown in FIG. 2.

The mechanism constituting a possible embodiment of the invention and shown in FIG. 2 is similar to that of FIG. 1, however instead of the brake-forming means 9 in the system 1, it has an assembly 13 enabling an electric motor 12 powered by a source 11 to drive the shaft 4 in the event of the hydraulic motor 7 of the system 1 failing.

More particularly, this assembly 13 enables the following operations to be performed:

when said hydraulic motor 7 fails and the electric motor 12 is in operation, the shaft 4 is driven by the electric motor 12 (operating state represented by chain-dotted lines in the block representing the assembly 12 in FIG. 2);

when said hydraulic motor 7 fails and the electric motor 12 is not operating, the shaft 4 and the shaft of the electric motor 12 are both locked, thus providing a bearing point for the differential 3 (operating state represented by dashed lines in the block 13); and when the hydraulic motor 7 is in operation, the shaft 4 and the shaft of the electric motor 12 are free to rotate, both relative to the casing in which they are located and relative to each other (state of operation represented by continues lines in FIG. 2 in block 13).

Figure 4:
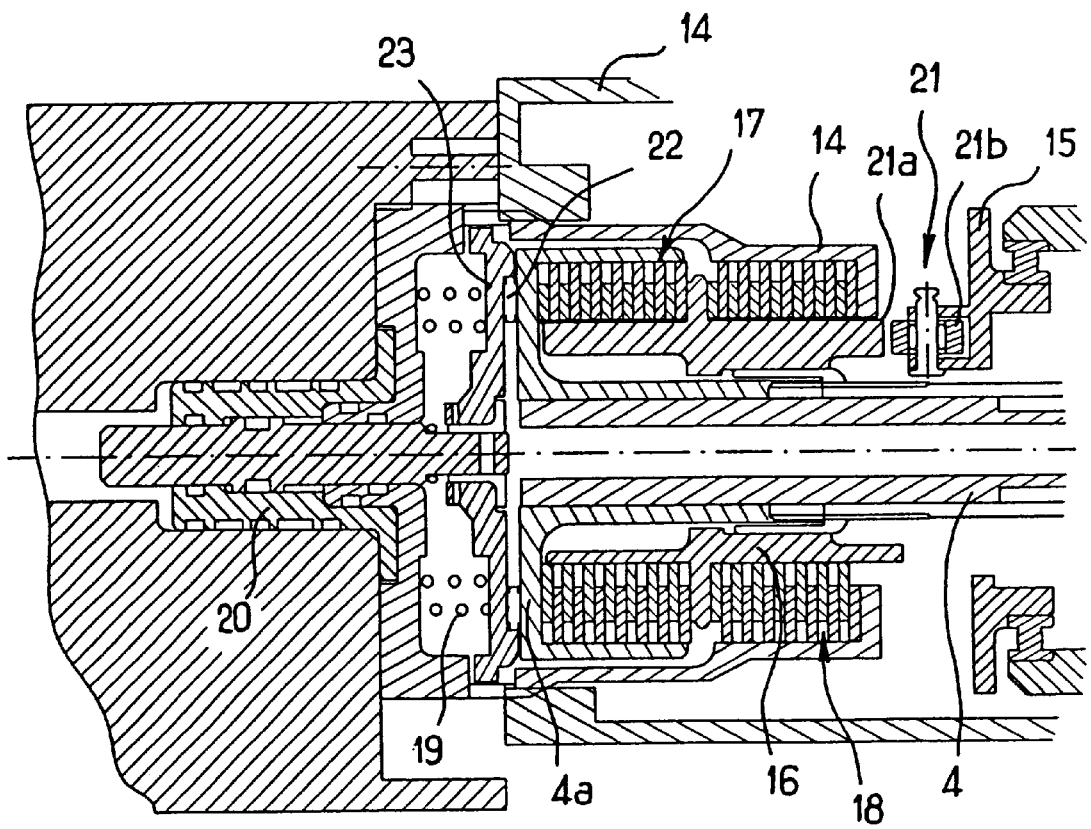

One possible structure for the assembly 13 is described below with reference to FIGS. 3 and 4.

This structure comprises:

a casing 14;

the shaft 4 of the system 1 which is rotatably mounted in said casing 14;

a rotor 15 rotatably mounted on the shaft 4 and driven by the electric motor 12;

an intermediate rotor 16 also rotatably mounted on the shaft 4;

a first set 17 of friction disks interposed between the rotor 16 and an end plate 4a secured to the shaft 4;

a second set 18 of friction disks interposed between the rotor 16 and the casing 14;

spring-forming means 19 suitable for acting on the end plate 4a via an end plate 23 against which said spring means bear and via roller pins 22 interposed between the end plate 23 and the end plate 4a, firstly to exert a force tending to put the disks of the set 17 into engagement and secondly, once the disks of the set 17 have engaged, to exert a force on the rotor 16 via the end plate 4a and the set of disks 17, where said force tends to cause the disks in the set 18 to come into engagement;

means 20 which, when the motor 7 of the system 1 is in operation, oppose the force exerted on the end plate 4a by the spring means 19; these means 20 are advantageously of the hydraulic system type, in particular when the motor 7 of the system 1 is itself a hydraulic motor; in a variant, in particular when said motor 7 is of the electrical type, the means 20 can be of the solenoid type; and means 21 comprising a cam 21a and complementary cam follower means 21b interposed between the rotor 16 and the rotor 15 and which, when the motor 12 is driving the rotor 15 while the rotor 16 is prevented from moving relative to the casing 14 by the set of friction disks 18, tends to urge the rotor 16 axially into a position in which the friction disks of the set 18 are no longer in engagement.

Figure 5A:
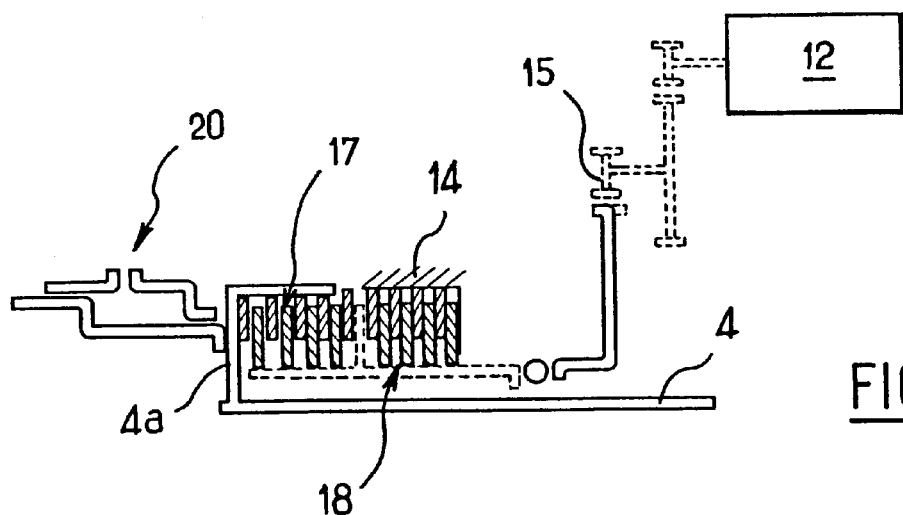
FIGS. 5a to 5c are diagrams showing three possible states for said assembly 13.
Figure 5B:
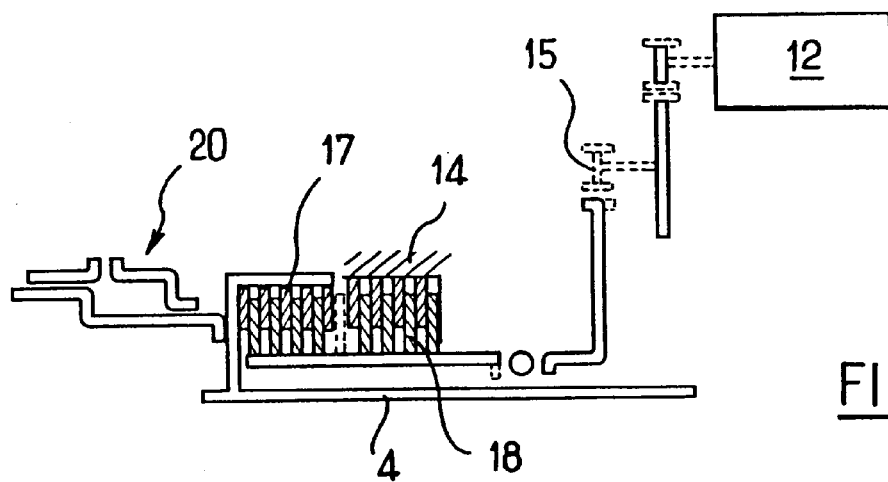
Figure 5C:
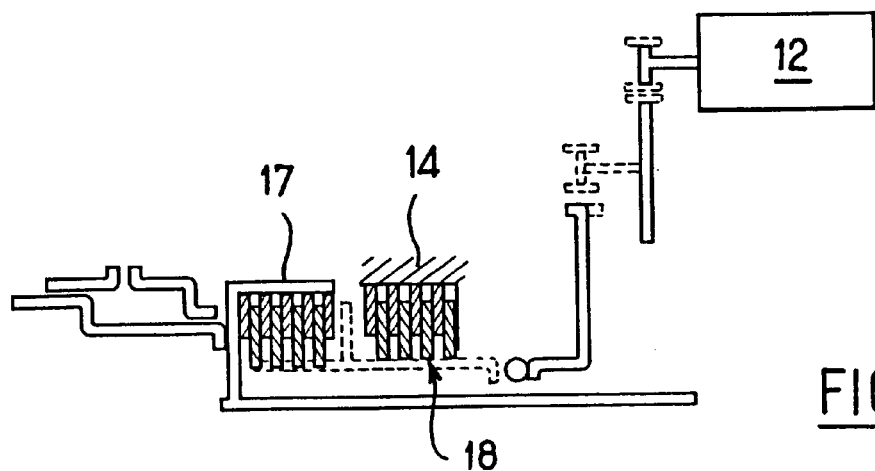

As shown in FIGS. 5a to 5c, such a structure has three operating states.

In the first of these states (FIG. 5a), when the motor 7 of the system 1 is operating normally, the force exerted by the means 20 on the end plate 4a balances the force exerted by the spring means 19. In this configuration, both sets of friction disks 17 and 18 are slack. The electric motor 12 is thus declutched from the shaft 4. It is the hydraulic motor 7 of the system 1 which drives said shaft 4.

In a second configuration (FIG. 5b) in which the motor 7 of the system 1 is no longer operating, e.g. because the pressure in its hydraulic circuit is too low, and in which the electric motor 12 is not running, the spring means 19 exert a force on the end plate 4a which keeps the friction disks of both sets 17 and 18 in engagement. The rotor 15 connected to the electric motor 12 and the shaft 4 of the motor 7 of the system 1 are then both locked relative to the casing 14.

In a third configuration (FIG. 5c), the motor 7 of the system 1 is no longer operating, but the electric motor 12 is running. When the means 20 cease to counter-balance the spring means 19, the spring means push back the end plate 4a so that the friction disks of the set 17 and then those of the set 18 come into engagement and thus tend to lock the shaft 4 and the rotor 16.

The rotor 15 driven by the motor 12 turns relative to the rotor 16, so the cam 21a and the cam follower means 21b push back the intermediate rotor 16 axially, thereby disengaging the disks of the set 18 while leaving the disks in the set 17 engaged.

The shaft 4 which is secured to the rotor 16 is free to turn relative to the casing 14 and it is then driven by the rotor 15 and the motor 12, with the cam 21a and the cam follower means 21b serving to exert rotary torque on the intermediate rotor 16.

Thus, the mechanism shown in FIG. 2 operates in four modes.

In a first mode, the two main systems 1 and 2 operate. Together they drive the shaft 6 and the load to which it is connected via the differential 3. The emergency motor 12 is then declutched from the shaft 4 and it is not switched on.

In a second mode, the main system 1 is operating, but the system 2 is no longer operating. The means 9 forming a brake on the system 2 prevent the shaft 5 from turning. The system 1 alone then drives the shaft G and its load. The emergency motor 12 is still declutched from the shaft 4 and it is not switched on.

In a third mode, the main system 1 is no longer operating while the system 2 is operating. The emergency motor 12 is still not switched on. Its outlet rotor and the shaft 4 of the motor 7 of the system 1 are then locked relative to the casing 14. It is the system 2 which controls movement of the load via the differential 3.

In a fourth mode, both systems 1 and 2 are no longer operating. The emergency electric motor 12 is switched on and it drives the shaft 4 of the system 1, while the brake-forming means 9 in the system 2 lock the shaft 5. It is then the motor 12 which drives the load via the differential 3.

The above-described apparatus is particularly advantageous for actuating an element for adjusting the tail plane of an airplane.

What is claimed is:

1. Actuator apparatus, in particular for an airplane flight control, the apparatus comprising at least two main drive systems and a differential which connects at least two corresponding outlet shafts from the at least two main drive systems to a control shaft connected to an element to be actuated;

means for locking at least one of the at least two outlet shafts when at least one of the at least two main drive systems is no longer operating; t at least one auxiliary drive motor and a clutch mechanism mounted on one of the at least two outlet shafts and suitable for automatically driving said one outlet shaft when all of the at least two corresponding main drive systems are not operating and for automatically locking at least one of said outlet shafts when all but one of said at least two main drive systems sand said auxiliary motor are not operating.

2. Apparatus according to claim 1, wherein the clutch mechanism comprises:

an intermediate rotor mounted to rotate on the outlet shaft of one of each of said at least two main drive systems;

first friction means interposed between said intermediate rotor and a portion secured to the outlet shaft of one of each of said at lest two main drive systems, said first friction means, when in engagement, uniting said intermediate rotor and said outlet shaft;

second friction means interposed between said intermediate rotor and a casing of the mechanism, said second friction means, when in engagement, uniting said intermediate rotor and said casing;

spring means suitable for exerting a force on a portion secured to the outlet shaft of one of each said at least two main drive systems, said force tending firstly to put the first friction means into engagement and secondly, when said means are in engagement, to exert an axial force on the intermediate rotor tending to put the second friction means into engagement;

means which oppose the force exerted by the spring means so long as at least one of the at least two main drive systems for the outlet shaft of one of each of said at least two main drive systems is in operation; and a cam and cam follower means interposed between said intermediate rotor and a rotor which is mounted to rotate on the outlet shaft of one of each said at least two main drive systems and which is driven by the auxiliary motor, said cam and cam follower means being such that when the auxiliary motor is in operation while at least one of the at least two main drive systems are not in operation, said cam and said cam follower means pushing the intermediate rotor axially back into a position where the second friction means are no longer in engagement and in which said intermediate rotor is driven.

3. Apparatus according to claim 1, wherein the main drive systems is hydraulic and the auxiliary drive motor is electrical.

4. Apparatus according to claim 2, wherein the main drive systems is hydraulic and the auxiliary drive motor is electrical, and wherein the means which oppose the force exerted by the spring means so long at least one of the two main drive systems is in operation, is a hydraulic piston with the force exerted by said piston being a function of the pressure in said at least one main drive system.

5. Apparatus according to claim 2, wherein the means which oppose the force exerted by the sprint means so long as said at least one of the two main drive systems is in operation is a solenoid.

6. Apparatus according to claim 2, wherein at least one of the first and/or second friction means comprises a set of disks.

7. Apparatus for actuating an element for adjusting the tail plane of an airplane, the apparatus being constituted at least two main drive systems and a differential which connects at least two corresponding outlet shafts from the at least two main drive systems to a control shaft connected to an element to be actuated;

means for locking at least one of the at least two outlet shafts when at least one of the at least two main drive systems is no longer operating; and at least one auxiliary drive motor and a clutch mechanism mounted on one of the at least two outlet shafts and suitable for automatically driving said one outlet shaft when ail of the at least two corresponding main drive systems are not operating and for automatically locking at least one of said outlet shafts when all but one of said at least two main drive systems and said auxiliary motor are not operating.

* * * * *